Figure 1:
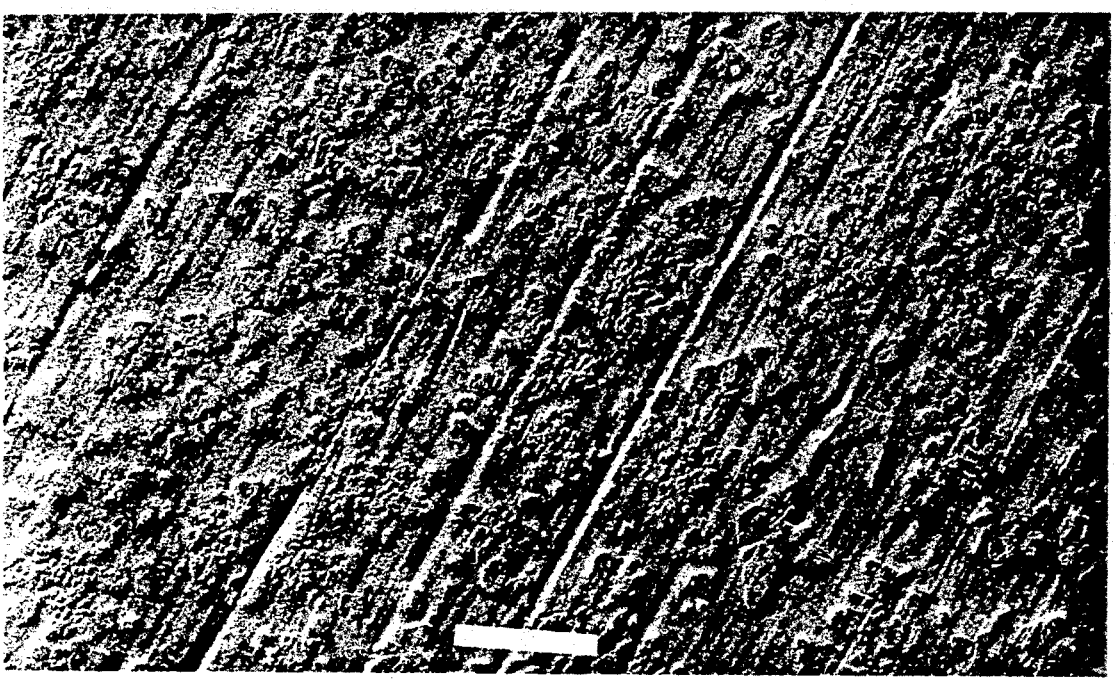

United States Patent [19]

Rittler

[11] 4,199,336
[45] Apr. 22, 1980

[54] METHOD FOR MAKING BASALT GLASS CERAMIC FIBERS

[75] Inventor: Hermann L. Rittler, Corning, N.Y.

[73] Assignee: Corning Glass Works, Corning, N.Y.

[21] Appl. No.: 945,507

[22] Filed: Sep. 25, 1978

[51] Int. Cl.² ............... C03B 37/00; C03B 32/00; C08L 91/00
[52] U.S. Cl. ............................ 65/2; 65/33; 106/50; 106/52; 106/39.6; 106/39.8; 106/99
[58] Field of Search ............ 65/2, 33, 111, 114, 65/12; 106/50, 52, 99, 39.6, 39.8

[56] References Cited

U.S. PATENT DOCUMENTS

| | | | |
|---|---|---|---|
| 3,557,575 | 1/1971 | Beal | 65/33 |
| 3,650,721 | 3/1972 | Hammel et al. | 65/2 X |
| 3,679,443 | 7/1972 | Mechel et al. | 65/2 X |
| 3,873,328 | 3/1975 | Brueggemann et al. | 106/50 X |
| 3,881,945 | 5/1975 | Trojer et al. | 65/2 X |
| 3,901,676 | 8/1975 | Heinze et al. | 65/2 X |
| 3,929,497 | 12/1975 | Clark-Marks | 65/2 X |
| 4,008,094 | 2/1972 | Beal et al. | 106/50 X |
| 4,009,015 | 2/1977 | McCollister | 65/33 |

Primary Examiner—S. Leon Bashore
Assistant Examiner—F. W. Miga
Attorney, Agent, or Firm—Clinton S. Janes, Jr.

[57] ABSTRACT

Fine-grained, polycrystalline, basalt-type glass-ceramic fibers, having a crystal content of at least 35% and particular application as fiber reinforcement in concrete structures, are disclosed. A method of production comprises treating a vitreous fiber in the temperature range of 900° to 1250° C. for a time not exceeding ten minutes, and preferably less than one minute.

5 Claims, 4 Drawing Figures

METHOD FOR MAKING BASALT GLASS CERAMIC FIBERS

BACKGROUND OF THE INVENTION

This invention relates to fine-grained, polycrystalline, glass-ceramic fibers produced from vitreous fibers of a basalt-type material, and particularly useful for reinforcing purposes.

It has become customary to employ asbestos fibers as a reinforcing agent in concrete structures such as pipes, tiles, panels, and the like. However, an extensive search has been underway for a suitable substitute because of the health hazards involved in handling asbestos material.

Glass fibers have been among the various alternatives under consideration. Since 1935, the glass fiber industry has become firmly established, and glass fibers are used in many widely diversified applications. One such application is the reinforcement of plastic materials used in molding structures ranging from musical instruments to automobile bodies.

Unfortunately, commercially available glass fibers have failed to provide all of the characteristics required for concrete reinforcement. In particular, the available fibers lack resistance to the alkaline environment that prevails when the common cements, such as Portland cement, are mixed with water. Glasses have been developed having a high resistance to an alkaline environment, but the difficulty in producing fibers from such glasses, and/or the intrinsic cost of such fiber production, have militated against their consideration for this purpose.

Basalt-type materials are widely available, and relatively inexpensive, natural materials. They are generally classified in mineralogy as basic volcanic rocks wherein the essential constituents are the minerals feldspar, pyroxene, and magnetite, with or without olivine, and a black basalt glass. It has been recognized that they are resistant to alkaline attack, a characteristic that makes them of particular interest in connection with alkaline environments such as are encountered in concrete work. Basalt materials are also easily melted and drawn as fibers, a further fact that makes them of interest as potential concrete reinforcement fibers. A detailed description of these materials, their physical and chemical characteristics, and their commercial history, is set forth in U.S. Pat. No. 3,557,575, granted Jan. 26, 1971 to G. H. Beall and H. L. Rittler.

That patent discloses the production of glass-ceramic articles from basalt-type materials. In accordance with its method, a basalt type batch, containing at least 5% $Fe_2O_3$, is melted; the melt is cooled below its transformation range and a glass article shaped therefrom; the glass is heat treated in the range of 640°–675° C. to form magnetite nuclei; and the nucleated glass is further heat treated to cause crystallization on the nuclei. Thus, the patent teaches that a magnetite crystal phase can be otained by heat treatment in the range of 675°–800° C., while heat treatment at a higher temperature in the range of 850°–1000° C. forms a clinopyroxene-magnetite mixed phase in which the former predominates. Heat treatment times of 0.5 to 4 hours are suggested.

It is observed that the glass-ceramic bodies have substantially better resistance to attack by either acid or alkaline solutions than do corresponding glass bodies. This resistance is ascribed to a residual glass phase rich in alumina and silica. The patent warns that large plagioclase spherulites tend to form if heat treating temperatures above 1000° C. are employed.

Recently, it was proposed, in U.S. Pat. No. 4,008,094, granted Feb. 15, 1977 to the inventors Beall and Rittler, that the resistance of basalt-type glass fibers to alkaline attack be improved by including 1 to 15% zirconia ($ZrO_2$) in the composition of the basalt melt from which the fibers were drawn. The patent further suggests that the glass fibers may be partially crystallized by internal crystallization to develop magnetic properties. Heat treatments ranging in time from 1 to 4 hours, and in temperature from 650° to 900° C., are proposed to develop a crystal phase composed of magnetite ($Fe_3O_4$), ulvospinel ($Fe_2TiO_2$), or solid solutions of these crystal forms. Necessarily, such crystal phases represent only a minor degree of crystallization since the total content of $Fe_2O_3$ plus $TiO_2$ in the glass is no more than about 10 to 15% by weight. The patent also notes that temperatures much in excess of 900° C. ought to be avoided since coarse-grained crystals of pyroxenes can develop.

It has been recognized that glass-ceramic materials tend to have greater inherent mechanical strength than their glass precursors since a dominant crystal structure is developed that is homogeneous and relatively fine-grained. In contrast, large, coarse crystals in a body normally tend to weaken the material and render it brittle, and hence are avoided.

PRIOR ART

In addition to the literature references thus far cited, the following patents are also considered of interest in connection with basalt materials and fiber formation therefrom:

U.S. Pat. No. 1,108,007, granted Aug. 18, 1914 to F. Ribbe, which discloses casting fused basalt, cooling the castings below 500° C., and reheating to 800° C. to devitrify the castings.

U.S. Pat. No. 1,893,392, granted Jan. 3, 1933 to H. L. Watson, which discloses controlling the devitrification of the Ribbe product by coordinating either an oxidation or a reducing atmosphere during melting with a subsequent devitrification step specific to the melting atmosphere.

U.S. Pat. No. 1,438,428, granted Dec. 12, 1922 to Paul Dhe', which discloses drawing fibers from a molten basalt bath and devitrifying these fibers at a temperature of 800° C.

U.S. Pat. No. 3,929,497, granted Dec. 30, 1975 to Colin Clark-Monks, which describes basalt-type compositions that can be fiberized and recrystallized by heating above the softening point, preferably in the range of 650° to 800° C.

U.S. Pat. No. 3,881,945, granted May 6, 1975 to F. J. Trojer et al., which discloses a method of producing a "ceramic-glass" fiber of improved modulus of elasticity in which a glass fiber is drawn, separated into two vitreous phases, and one of these phases is then crystallized in part at least.

U.S. Pat. No. 4,042,362, granted Aug. 16, 1977 to J. F. MacDowell et al., which discloses a method of rapidly nucleating and crystallizing glasses by heat treatment of a few minutes to an hour, and reviews prior disclosures of rapid crystallization techniques. The patent does not mention basalt-type materials.

Thus, vitreous fibers may be formed from melts of natural basalt minerals, from such natural materials modified by additives, or from synthesized batches in the nature of glass batches. Further, these fibers may be devitrified by conventional heat treatment, or may have a magnetic crystal phase of minor magnitude developed by internal nucleation. However, it would be desirable to produce a more highly crystallized, fine-grained fiber of a glass-ceramic nature from a basalt-type material. Further, it would be even more desirable to provide a method of production compatible with ordinary fiber drawing practice.

SUMMARY OF THE INVENTION

It is then a basic purpose of the present invention to provide glass-ceramic fibers having a basalt-type composition and a crystal phase of substantial magnitude, preferably over 50%. A further purpose is to produce such fibers having a sufficiently fine-grained crystalline phase to be resilient while also being highly resistant to chemical attack, particularly from an alkaline environment. Another purpose is to provide a convenient, inexpensive method of producing such fibers. A still further purpose is to provide a method of converting a basalt-type fiber from a vitreous state to a glass-ceramic state as the fiber is being drawn from a melt.

In furtherance of these and other purposes, I have now discovered that vitreous basalt fibers, having a diameter not greater than about 250 microns, can be internally crystallized to form corresponding glass-ceramic fibers having a magnetite-clinopyroxene mixed crystal phase constituting at least 35% of the fiber and preferably over 50%. I have further found that such fibers can be produced by a heat treatment not exceeding ten minutes in duration and preferably less than one minute. This discovery makes it feasible to continuously draw fibers from a basalt melt, and to subject these fibers to the necessary heat treatment for internal crystallization while they are being drawn and before being gathered, chopped, or otherwise processed for addition to concrete mixtures as reinforcement.

In accordance with my method, a vitreous basalt fiber is subjected to a heat treatment in the range of 900° to 1250° C. for up to ten minutes, preferably for a time less than one minute. Since the actual temperature of a fiber is virtually impossible to measure during a short exposure time, the characteristic temperature range represents temperatures to which the fiber is exposed, and which it is assumed that it reaches during such exposure.

THE DRAWINGS

Figure 2:
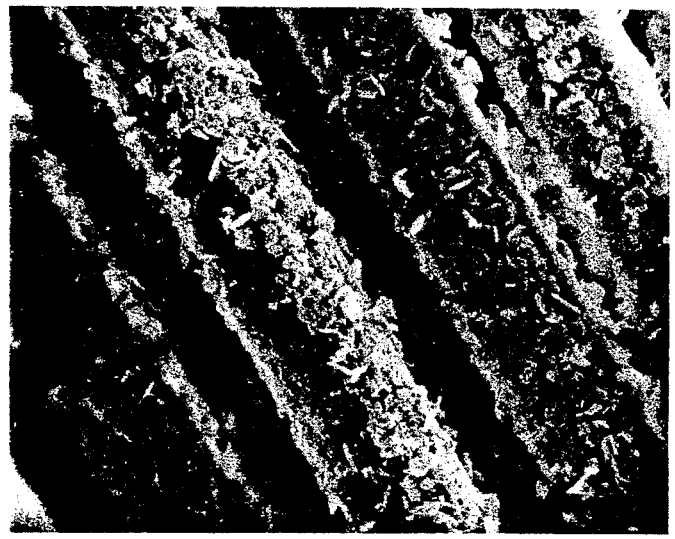
Figure 3:
Figure 4:
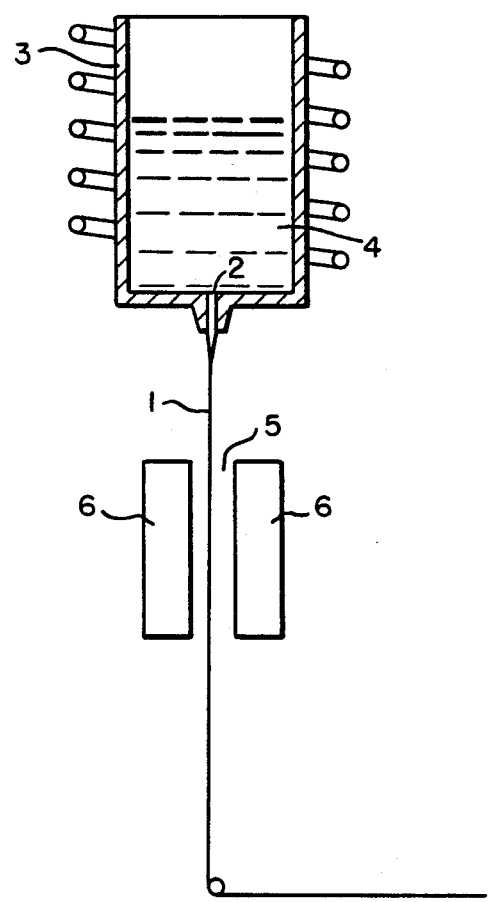

The invention is hereafter described with reference, in part, to the attached drawings wherein, FIG. 1 is a reproduction of an electron photomicrograph of a fiber in accordance with the present invention, FIG. 2 is a magnified photograph of a basalt glass fiber after treatment in a test solution, FIG. 3 is a magnified photograph of a basalt glass-ceramic fiber after treatment in the same test solution, and FIG. 4 is a schematic illustration, with the apparatus partially in section, of a conventional fiber drawing process incorporating the characteristic heat treating step of the present invention.

GENERAL DESCRIPTION

The glass-ceramic fiber of the present invention is produced by internally nucleating and crystallizing a corresponding glass fiber having a basalt-type composition. The crystal phase in the glass-ceramic fiber is a mixture of magnetite and clinopyroxene (augite) crystals that constitutes at least 35% of the fiber and preferably over 50%.

The term "fiber" is used, as a matter of convenience, to include both fibers and filaments. Thus, the glass-ceramic fiber of the invention may be a normal fiber on the order of several microns diameter, or it may range in size up to a filament having a diameter of about ten mils or 250 microns. Larger sizes tend to behave as conventional bodies rather than fibers.

Permissible crystal size will vary with fiber diameter, the ratio of fiber diameter to crystal size being at least 10:1, and usually substantially greater. For most applications relatively small diameter, or fine, fibers on the order of ten to twenty microns are contemplated. In such fibers, an average crystal size less than a half micron is preferred.

FIG. 1 of the accompanying drawing is an electron photomicrograph showing the crystal distribution and size in a typical fiber of the invention. The fiber depicted is 13 microns in diameter and was crystallized (cerammed) from a basalt glass fiber by heat treatment for 30 seconds at 1000° C. The white marker at the bottom of the picture is one micron in length.

It will be observed that the crystal content in the micrograph approximates half of the fiber cross section, thus indicating approximately 50% crystal phase by volume. Also, there are no crystals over a micron in size and average size is substantially less than a half micron. A particular feature of the present glass-ceramic fibers is their fine-grained crystal structure whereby a resilient fiber adapted to reinforcing use is obtained. At the same time the fiber has the outstanding chemical resistance, particularly to alkaline solutions, that was noted for basalt bodies in U.S. Pat. No. 3,557,575.

Basically, production of the present fibers contemplates three steps. First, crushed basalt rock, optionally containing various additives as modifiers, is melted in a crucible, pot, or continuous glass melting unit, depending on the quantity of product wanted and the manner of fiber formation to be utilized. Second, when a suitably homogeneous melt is attained, amorphous fibers are produced from the melt in any conventional manner such as drawing, spinning, or blowing. Since fiber orientation is important in reinforcement applications, fibers for this purpose will normally be drawn, wound on a drum, and subsequently cut into bundles. Finally, the fibers are subjected to a heat treatment to convert them from the vitreous state to the glass-ceramic state by internal development of a polycrystalline phase. This heat treatment consists of exposing the fibers to a temperature in the range of 900° to 1250° C. for a time not exceeding ten minutes, and preferably less than one minute.

It is explained in considerable detail in U.S. Pat. No. 3,557,575 that there are various types of basalt representing considerable variation in composition, the major constituents being $SiO_2$, $Al_2O_3$, $MgO$, $CaO$ and iron oxides, and the alkalies, $Na_2O$ and $K_2O$, being present in lesser amounts. The patent identifies and gives examples of three major types of basalt, but indicates that tholeiitic basalts have several advantages for glass and glass-ceramic production. Inasmuch as a specific basalt composition is not a critical element in the present invention, the teachings of the patent, relative to composition and melting procedures, are generally applicable to the present invention, and are incorporated herein by reference.

Reference is also made to U.S. Pat. No. 4,008,094 where the composition of a particular tholeiitic basalt from Westfield, Mass. is set forth, and the modifications of this basalt with additions of zirconia to its melt are disclosed. These modified compositions represent preferred materials for the present invention, and the specific teachings of the patent, relative to compositions and melting procedures, are also incorporated by reference.

The heat treatment of the present invention is particularly adapted to integration with a conventional fiber drawing process. However, the invention is not limited to any specific method of fiber formation. Thus, it is possible to form fibers, cool them to ambient temperature, and then reheat them in accordance with the invention. In fact, as an experimental expedient, the work hereafter described was performed in this manner.

Likewise, any conventional heat treating means, readily adapted to fiber treatment, may be employed. For example, fibers may be drawn through a tubular heater, or between opposed radiant heaters.

In commercial practice, a glass fiber drawing operation will normally be employed, and the heat treating step of the present invention coordinated with such drawing operation into one continuous sequence. This is illustrated schematically in FIG. 4 wherein a continuous glass fiber or filament 1 is shown being drawn from orifice 2 of a heated bushing 3 containing a molten bath of basalt 4 having a composition such as shown above. As fiber 1 is drawn from orifice 2, the fiber rapidly cools, but is quickly drawn into a reheating zone 5 which is maintained at a temperature of 900° to 1250° C., preferably in the range of 1000° to 1100° C., by radiant heat sources 6. Fiber 1 passes rapidly through reheat zone 5 in a period of time normally substantially less than one minute.

The steps or stages in the nucleation and crystallization of a basalt glass body are depicted and described in some detail in U.S. Pat. No. 3,557,575. Reference is made thereto inasmuch as it is belived that crystallization proceeds in the same manner in the present fibers, but much more rapidly. Thus, it appears that, as a basalt-type glass fiber is drawn from orifice 2, it cools and becomes nucleated. Then, as the nucleated fiber passes through reheat zone 5, a polycrystalline phase grows on such nuclei. In accordance with the patent teaching, magnetite nuclei form and, at low temperatures, a magnetite crystal phase would grow on the nuclei. At the higher temperatures of the present invention, a silicate pyroxene-type crystal phase also develops and predominates.

It is my belief that this desirable mixed crystal formation, which occurs in accordance with the present invention and contrary to prior predictions, is associated with the essentially instantaneous response of fibers to heating and cooling conditions. Thus, extended times are not required to attain crystallization. Hence, crystallization temperatures may be reached, and also released, almost instantaneously. This situation differs markedly from that in a large body, a fact not fully appreciated heretofore. The extremely rapid crystallization which occurs at the high temperatures characteristic of the present invention produces a relatively fine-grained crystal phase in the fiber. Consequently, a fiber produced by the present method is less brittle than one produced by known lower temperature, longer time treatments which tend to produce larger size crystals.

As the crystallized or glass-ceramic fiber leaves the reheat zone, it cools and may be wound on a drum or turned to a horizontal direction by a guide (as shown) for other handling, either being standard fiber handling practices.

For reinforcement purposes, fibers are normally placed in a cement slurry in parallel, oriented relation. To this end, a roll of fiber on a drum, for example, may be chopped in known manner into bundles of desired length for placing in a concrete matrix.

The present invention may also be carried out in conjunction with a pulsing heat treatment technique as described in detail and claimed in my companion application Ser. No. 945,506, entitled "Method of Producing a Glass-Ceramic" and filed of even data herewith. In particular, application of heat to a basalt fiber in short pulses tends to produce an appreciably finer grain crystal phase with the resulting fiber having appreciably greater resilience than attained with a single heat treatment of similar duration. For example, a 20 second heat treatment may be applied as 10 two second pulses rather than a continuous 20 second treatment.

SPECIFIC DESCRIPTION

Table I sets forth, in terms of parts by weight on an oxide basis, the compositions of several exemplary melts which were used in studying the present invention. The additives, indicated in oxide form, were either added in this form or as nitrates or carbonates in accordance with known glass making practice.

TABLE I

|  | 1 | 2 | 3 | 4 | 5 | 6 |
|---|---|---|---|---|---|---|
| Basalt | 100 | 100 | 100 | 100 | 100 | 100 |
| $ZrO_2$ | — | 2.5 | 7.5 | 2.5 | 3.0 | 7.5 |
| $TiO_2$ | — | — | — | — | 5.0 | — |
| $SiO_2$ | — | — | 10 | 7 | — | 10 |
| $Na_2O$ | — | — | 10 | 7 | — | 10 |
| CaO | — | — | — | — | — | 10 |

As indicated earlier, the basic composition of the basalt used is not critical to the present invention and it is contemplated that any of the known basalts may be employed. However, a low alkali ($R_2O$) content, preferably less than 5%, generally provides better chemical durability in the end product. For this reason, the earlier referred to tholeiitic basalt from Westfield, Mass. was employed in the compositions of Table I. This basalt has the following approximate analysis in weight percent on an oxide basis:

| $SiO_2$ | 52.0 | CaO | 9.3 |
| $TiO_2$ | 1.0 | $Na_2O$ | 3.2 |
| $Al_2O_3$ | 14.1 | $K_2O$ | 1.2 |
| MgO | 6.4 | $Fe_2O_3$ | 12.8 |

The basalt component was crushed to pass through a No. 50 U.S. Standard Sieve (297 microns) and then blended with additives in finely divided form to achieve a homogeneous mixture for melting. The batch mix for each composition was then deposited in a platinum crucible which was placed in a gas fired furnace operating at about 1500° C. After holding at that temperature for about 6 hours, a homogeneous melt resulted and glass fibers of varying size were drawn from the melt for use in present studies. Flat molded plates of glass were also poured for use in measuring physical properties.

It is generally accepted that the nuclei formation preceding crystallization is of a magnetite nature, the necessary iron oxide being present in the basalt composition. Accordingly, a mildly oxidized melt is desired wherein the $Fe^{+3}/Fe^{+2}$ ratio is on the order of 1 or above. For this purpose, a few parts by weight of ammonium nitrate ($NH_4NO_3$) were included in each batch prior to melting. It will be appreciated that the oxides of either titanium or zirconium, if present, may also contribute to the nuclei formation.

It has been observed that the degree of crystallinity is affected by fiber diameter as well as time and temperature of heat treatment. In general, longer times and higher temperatures enhance the degree of crystallinity attained. For any given temperature and time, crystallization takes place more rapidly in a smaller fiber.

These effects are illustrated by certain studies reported below, as well as by reference to U.S. Pat. No. 4,008,094. In that patent, heat treating temperatures did not exceed 900° C. and the crystal phase formed was magnetite and/or ulvospinel. As noted earlier, this represents only a minor part of the glass.

The various effects on degree of crystallinity and rate of crystallization are seen from the following table which records ceramming schedules employed on various size fibers and the crystal phases observed.

| Fiber size (microns) | Heat Treatment | | Crystal Phase |
|---|---|---|---|
| | Time (sec.) | Temp. (°C.) | |
| 13 | 80 | 900 | Magnetite + Augite |
| 13 | 20 | 1000 | " |
| 25 | 80 | 900 | " |
| 125 | 80 | 900 | Magnetite |
| 125 | 80 | 1000 | Magnetite + Augite |
| 250 | 30 | 1000 | " |
| 250 | 60 | 1000 | " |
| 250 | 8 | 1150 | Magnetite |

Thus, the present observations tend to confirm prior experience in larger bodies that the nuclei which form initially are magnetite, and that such nuclei grow on themselves or enlarge under either short time or low temperature conditions. This is particularly true in larger size, filamentary bodies where crystallization is slower.

The present invention is based on the discovery that a combination of magnetite and augite crystals form under the unique high temperature, short time crystallizing conditions of the present method. Further, this mixed crystal phase grows in the substantially uniform, fine-grained manner that is characteristic of glass-ceramic materials.

It may be observed, however, that minimum crystallization conditions can not be used with relatively large filaments. Thus higher temperature crystallization temperatures, i.e., on the order of 1000°–1100° C., and at least ten seconds time, are recommended for filaments greater than 25 microns in diameter.

In order to compare the chemical durability of basalt glass and basalt glass-ceramic fibers, and particularly to determine relative utility for cement reinforcing purposes, a supply of 13 micron basalt glass fiber was drawn from a melt of composition 2. A portion of this fiber was cerammed, that is, converted to the glass-ceramic state by heat treatment for 120 seconds at 1000° C., and a second portion was retained in the glass state. Samples of each were exposed for nine (9) weeks at 51° C. to a standard cement effluent, known as Lawrence solution, and being a sodium salt buffered, saturated solution of calcium hydroxide. Following this exposure, the glass and glass-ceramic fibers were removed, rinsed and photographed at various magnifications.

FIGS. 2 and 3 are photographic reproductions of the glass and glass-ceramic fibers, respectively, at 2000 times magnification. It will be observed that the glass fibers are covered with the reaction product of glass and test solution. In contrast, the cerammed fibers show much less evidence of reaction, except along a cord line in the fiber. This clearly evidences the superior qualities of the present cerammed fibers for cement reinforcing purposes.

It will be appreciated that a glass cord is usually an inhomogeneity of distinctly different composition from, and hence quite unrepresentative of, the glass. It can usually be eliminated by controlled melting and/or stirring of the melt.

I claim:

1. A method of producing glass-ceramic fibers having a diameter not greater than about 250 microns and having a fine-grained, mixed magnetite-clinopyroxene crystal phase constituting at least 35% of said fiber which comprises,
    melting a raw material batch composed predominantly of a basalt-type material,
    forming vitreous fibers from such melt while simultaneously,
    forming magnetite nuclei in the glass fibers, and
    reheating said glass fibers to a temperature between 900°–1250° C. for a time not exceeding ten minutes to develop said mixed magnetite-clinopyroxene crystal phase on such nuclei.

2. A method in accordance with claim 1 wherein the reheat treatment time is less than one minute.

3. A method in accordance with claim 1 wherein the temperature range is 1000°–1100° C.

4. The method of claim 1 wherein the basalt-type material is a tholeiitic basalt having an $R_2O$ content below 5%.

5. The method of claim 1 wherein the batch is maintained mildly oxidizing by adding ammonium nitrate ($NH_4NO_3$) to the batch.

* * * * *